Patented June 20, 1939

2,163,147

UNITED STATES PATENT OFFICE 2,163,147

FIXATION OF CHLOROPHYLLIAN COLORED MATTER

Victor Charles Emile Le Gloahec, Rockland, Maine, assignor to Algin Corporation of America, New York, N. Y., a corporation of Delaware No Drawing. Application August 12, 1938, Serial No. 224,507

20 Claims. (Cl. 260—116)

This invention relates to the fixation of chlorophyllian colored matter such as the chlorophyllian colored matter of seaweeds. One of the objects of this invention is the fixation of chlorophyllian colored matter of seaweeds so that chlorophyllian colored matter can be separated from other useful components of seaweeds.

One of the components of seaweed which is of special value commercially is an organic substance of complex molecular structure which is commonly identified by the name "algin" or "alginous material". Alginous material is contained in greater or lesser degree in practically all seaweeds. The seaweeds known at the present time which have the greatest value, because of their content of alginous material, are found in the classes phaeophyceae, laminaria and particularly such well-known varieties as nereocystis, macrocystis, alaria, laminaria digitata, laminaria saccharina, certain fuci and the like.

Seaweeds, in addition to alginous material, contain a number of different mineral and organic substances. Thus all seaweeds take up from the media in which they grow and store up in concentrated form certain mineral and organic substances contained in such media. Seaweeds likewise develop a great number of compounds of these mineral and organic substances by the mechanism of synthesis and analysis common to vegetable life. Thus, for example, seaweeds produce from the nitrogenous organic material that they take up from the water in which they grow various proteinous or albumenoid substances and amides; the proteinous or albumenoid substances being about 70% of the total nitrogenous matter in the seaweed and the amides being about 30% of the total nitrogenous matter in the seaweed. The seaweed as a whole contains about 2½% to about 5½% of nitrogenous matter depending upon the species of the seaweed and depending upon the distance at which the seaweed grows below the surface of the water.

The nitrogenous substances contained in seaweed are partly soluble in fresh water. Usually about 30% of the nitrogenous material in seaweed may be extracted by washing the seaweed with fresh water.

In addition to nitrogenous materials, seaweeds contain certain colored matter which is essential to the life of the seaweed. The colored matter of seaweed may be referred to generally as chlorophyllian pigments. The colored matter absorbs the rays of the sun even though the seaweed grows at a considerable depth below the surface of the water and enables the seaweed to create new cellular structures in the process of growing. The seaweeds mentioned above are generally of a somewhat brown coloration. The brown coloration is due to chlorophyllian pigments like fucoxanthine associated with xanthophyllian pigments such as carrotin and the like. Generally the amount of brown pigment is increased by exposure to sun. Thus seaweeds which float at the surface of the sea or which become exposed to the air at low tide are richer in fucoxanthine than seaweeds which grow at great depths.

When seaweed is harvested for industrial processing for the purpose of recovering alginous material therefrom, it is the usual practice to first demineralize the seaweed as by washing the seaweed with fresh water or certain aqueous solutions and then treat the demineralized seaweed with an alkaline solution for the purpose of dissolving the alginous material and separating it from the seaweed cellulose, i. e., algulose. The colored matter in the seaweed is very soluble in the alkaline solution which is used to dissolve the alginous material and to separate it from the algulose. For this reason, alkaline solutions of alginous material extracted from seaweed contain a high percentage of the colored matter in the seaweed. The presence of the colored matter in alginous material is very disadvantageous commercially for a great many uses of alginous material.

The alginous material contained in the alkaline solution is generally recovered by coagulating the alginous material in the solution by means of an acid, by means of certain salts such as the alkaline earth salts, or by means of alcohol. During the coagulation of the alginous material the colored matter of the seaweed becomes fixed on the coagula of alginous material, inasmuch as these colored substances have a great affinity for the alginous material.

Upon the treatment of seaweed with an alkaline solution for the extraction of alginous material therefrom, proteinous materials are also extracted, inasmuch as a large proportion of the proteinous materials in the seaweed are soluble in the alkaline solution. The most of the extracted proteinous substances are like the alginous material in their property of coagulating with the alginous material in the presence of acid or alcohol or by the action of certain salts. It has been mentioned above that the colored matter of the seaweed tends to become fixed upon coagula of alginous material upon coagulating the alginous material contained in an alkaline solution. As a result of the pigmentary fixation it is very difficult to remove in a practical and economic way the colored matter of the seaweed from the alginous material so as to obtain the alginous material in a white condition.

While recovered alginous material containing the colored matter of seaweed may be treated with bleaching agents, in order to bleach the color, the bleaching agents are extremely injurious to the alginous material and are destructive of the properties of the alginous material which render it of value commercially.

In the copending application, Serial No. 1,076, filed January 9, 1935, by me jointly with John Robert Herter (Patent No. 2,128,551, issued August 30, 1938), a method of removing the colored matter of seaweed from an alkaline solution of alginous material is disclosed, which method comprises the inclusion in an alkaline solution of alginous material of a substance such as a gelatinous metal hydrate or a coagulated alginous material which is absorptive of the colored material. However, notwithstanding this treatment, some of the colored matter may remain combined with the alginous material and be carried down with the coagula of alginous material formed by adding an acid or alcohol to the alkaline solution of the alginous material. Such remaining colored matter may, according to the method set forth in said application, Serial No. 1,076 (Patent No. 2,128,551), be removed from the coagulated alginous material by washing the coagulated alginous material with a volatile solvent in which the alginous material is insoluble but in which the colored matter is soluble. Moreover, in the process described in said application, Serial No. 1,076 (Patent No. 2,128,551), a small percentage of the colored matter in the seaweed remains in the algulose or cellulosic fiber after the alginous material has been separated therefrom by dissolving it with an alkaline solution, inasmuch as a small proportion of the colored matter is not readily soluble in the alkaline solution used for the purpose of extracting the alginous material.

It is an object of this invention to fix chlorophyllian pigment such as the colored matter of seaweed with another body which can readily be separated from a liquid. I have found that chlorophyllian pigment has the property of becoming fixed to coagulated proteinous material. When a protein coagulant is added to a mass containing proteinous material and chlorophyllian pigment the protein becomes coagulated and the colored matter becomes fixed with the coagulum so that it can be readily handled and separated from a solution containing dissolved substances, e. g., dissolved alginous material.

It has been mentioned above that in the process of said application, Serial No. 1,076 (Patent No. 2,128,551), a large amount of the colored matter of seaweed together with some proteinous material of the seaweed is washed out of the seaweed and is carried with the alkaline solution of alginous material that is recovered from the seaweed. According to the present invention, this solution can be readily clarified by adding substances thereto adapted to coagulate the proteinous material without coagulating the alginous material in the solution. Protein coagulants such as formic aldehyde, tannic acid and the like which are described and exemplified more in detail hereinbelow may be used for this purpose. Since the solution contains some of the proteinous material of the seaweed, the coagulation of the proteinous material causes the colored matter to become fixed to the coagulated proteinous material so that the colored material as carried by the proteinous coagulum can be readily separated from the mother liquid including the alginous material that remains dissolved in the mother liquid. If in order to get a high degree of clarification, proteinous material is desired in addition to that which is derived from the seaweed, proteinous material such as gelatine, casein, egg albumen, or blood albumen can be dispersed in the dispersion of chlorophyllian colored matter before the addition of the protein coagulant to coagulate the proteinous material and fix the chlorophyllian colored matter therewith. Similarly, proteinous material may be added to any aqueous dispersion of chlorophyllian colored matter which does not contain any naturally occurring proteinous material so that the advantages of this invention may be realized. By using a substance such as tannic acid or formaldehyde that does not coagulate the alginous material, the solution of alginous material can be recovered and can be clarified very readily by filtration or by introducing a multiplicity of bubbles into the mass to cause the coagulated proteinous material to rise to the surface so that it and the chlorophyllian colored matter carried thereby can be readily separated from the mother liquid. Ways by which bubbles can be generated and used for effecting such a separation are described in said copending application, Serial No. 1,076 (Patent No. 2,128,551), in connection with the separation of algulose from an alkaline solution of alginous material.

The amount of protein coagulant that is added is optional. The greater the amount of the protein coagulant, the more rapidly the coagulation may be caused to occur. If excessive amounts of protein coagulant are used, however, the recovery of the chlorophyllian colored matter from the coagulated proteinous material is rendered more difficult. By using lesser amounts of protein coagulant less than complete coagulation of the proteinous material coupled with fixation of colored matter can be caused to occur, as may be desired. For a solution of alginous material containing about 0.4% of sodium carbonate, about 0.1 to 0.2% of alginous matter, about 0.01% of proteinous material, and about 0.001% of chlorophyllian colored matter, addition of about 2% of formic aldehyde will cause coagulation of the proteinous material and a substantially complete fixation of the chlorophyllian colored matter of the seaweed on the resulting coagulum.

In another way of practising this invention, the colored matter of seaweed is fixed together with coagulated proteinous material upon the algulose of the seaweed so that components of the seaweed, e. g., alginous material may be separated from the algulose and likewise from the colored material of the seaweed which has been fixed upon the algulose. For example, in the practice of this invention one can fix the colored matter of seaweed on algulose so that upon extracting alginous material from the seaweed by means of an alkaline solution the alkaline solution is recovered in a substantially uncolored condition.

The advantages of this way of practising this invention are readily apparent. By fixing the colored matter of the seaweed on the algulose and recovering a substantially uncolored solution of alginous material from the seaweed, it is possible to make commercially a substantially white algin merely by coagulating (by an acid, salt, alcohol, or the like) the alginous material that is extracted from seaweed by means of the alkaline solution. The alginous material is not adversely affected by the action of a bleaching agent since no such bleaching agent is necessary. Moreover, one can dispense with the steps mentioned hereinabove and in the aforesaid application, Serial No. 1,076 (Patent No. 2,128,551), of incorporating in recovered alkaline solution of alginous material absorptive agents for the purpose of absorbing and thereby removing colored matter from the alkaline solution. Likewise, one can dispense with washing the coagulum of alginous material for the purpose of dissolving out absorbed colored matter.

It is also of great advantage according to this invention that the colored matter of the seaweed may be fixed upon the algulose in its entirety. In methods heretofore practised including the method described in application, Serial No. 1,076 (Patent No. 2,128,551), the colored matter is taken out in portions at different stages in the process. Thus, in the method described in the said application, Serial No. 1,076 (Patent No. 2,128,551), a small portion of the colored matter is taken out with the algulose, the major portion of the colored matter is absorbed upon an absorptive material such as a gelatinous metal hydrate, and a small part of the colored matter is taken out by means of volatile solvents used in washing coagulated alginous material. When the colored matter is removed in portions at different stages of the process, it is difficult to thereafter recover the colored matter of the seaweed from the different portions that have been removed from the seaweed. The colored matter of the seaweed is of considerable value. It is, therefore, of great advantage according to this invention that the colored matter in its entirety might be recovered as fixed upon the algulose of the seaweed. The extraction of the colored matter from the algulose whereby the colored matter may be extracted therefrom is described in my application filed on even date herewith, Serial No. 224,508 entitled Fixation and recovery of chlorophyllian colored matter.

In order to fix the colored matter of the seaweed upon the algulose of seaweed, the seaweed is treated with a protein coagulant. I have found that by coagulating the proteinous material of the seaweed the colored matter of the seaweed becomes fixed to the coagulated proteinous material carried by the algulose of the seaweed. Tannins, salts of picric acid, salts of aluminum and chromium, and other protein coagulants such as quinone, benzo quinone, ferric salts, ceric salts, gold salts, platinum salts and the like, have the effect not only of coagulating the protein material of the seaweed so as to fix it upon the algulose in the seaweed, but also of fixing the colored matter of the seaweed with the proteinous material on the algulose of the seaweed so that the colored matter remains fixed upon the algulose of the seaweed, even in the presence of an alkaline solution suitable for extracting alginous material from the seaweed. The term "protein coagulant" is to be understood as including substances such as the metallic salts above-mentioned which have a precipitating effect on proteinous materials. However, when the coagulated proteinous material is to be separated from the alginous material the use of protein coagulants other than metallic salts is preferable, inasmuch as metallic salts have a precipitating effect on alginous material. The metallic salts may, however, be used, inasmuch as the coagulated proteinous material is more resistant to peptization than the precipitated alginous material. By controlled addition of alkali a pH value of the aqueous mass can be attained at which the proteinous material carrying the chlorophyllian colored matter remains coagulated and the alginous material becomes dissolved. Moreover, if, after the proteinous material is coagulated by a metallic salt, the coagulum is washed with a dilute acid, the metallic salt can be removed, and the alginous material can be caused to occur in dissolved state without peptizing the proteinous coagulum as by treating the mass with an alkali until the mass is made slightly alkaline, insufficient alkali being used to peptize proteinous material.

I have found formic aldehyde to be particularly desirable as a protein coagulant for use in the fixation of the colored matter of seaweed on the algulose of seaweed. Formic aldehyde is particularly effective in this regard. Moreover, formic aldehyde not only has the advantage of fixing the colored matter of seaweed on the algulose of seaweed, but also has the advantage of being a very effective anti-fermentive agent. The property of formic aldehyde as an anti-fermentive agent permits the seaweed to be kept for a period of several months and even indefinitely without having to dry the seaweed for the purpose of preventing fermentation. This is of great importance in the industrial handling of seaweeds, inasmuch as seaweeds are commonly harvested where they are grown and shipped over considerable distances for processing.

The treatment of seaweed to affix the colored matter of the seaweed on the algulose of the seaweed may be carried out either on the seaweeds as freshly taken from the water or on seaweeds which have previously been demineralized. The previous demineralizing of the seaweed has the advantage of requiring a lesser consumption of the protein coagulant. The seaweed may be demineralized by many known methods such as washing the seaweed with water or preferably by treatment of the seaweed with an alkaline earth salt solution in the manner described in the aforesaid application, Serial No. 1,076 (Patent No. 2,128,551).

The fixation of the colored matter of seaweed on the algulose of seaweed in the practice of this invention may be illustrated in connection with the use of formic aldehyde which, when used, has the double function of being a protein coagulant and an anti-fermentive agent. The seaweed which is preferably demineralized, as mentioned hereinabove, is treated with formic aldehyde solution. The seaweed is then removed from the formic aldehyde solution and permitted to stand without washing so as to permit the fixation of the colored matter on the algulose of the seaweed to become as complete as possible. The bath from which the seaweed has been removed can be reused for the treatment of further seaweed. However, during the treatment of the seaweed with the formic aldehyde there is a considerable diminution of the concentration of the formic aldehyde in the bath due either to adsorption of the formic aldehyde on the seaweed or to some chemical action which may take place between the formic aldehyde and the proteinous material in the seaweed. After the seaweed has been removed from the bath of formic aldehyde and after it has been permitted to stand until the fixation of the colored matter is substantially complete, the seaweed may be treated with an alkaline solution to extract the alginous material in the usual way. It will be found that the alkaline solution of alginous material is recoverable in a substantially colorless condition.

The fact that the seaweed is permitted to stand until the fixation of the colored matter on the algulose of the seaweed is substantially complete is especially convenient when the seaweed is shipped from the place where it is harvested to a plant remote therefrom. The seaweed as extracted from the water in such case may be immediately treated with the formic aldehyde bath and removed from the bath. The residual formic aldehyde remaining on the seaweed preserves the seaweed during shipment to the plant and at the same time accomplishes complete fixation of the colored matter on the algulose of the seaweed so that the seaweed arrives at the plant in an unfermented condition and in a condition which enables the alginous material of the seaweed to be extracted in a colorless condition without further treatment of the seaweed. The following is a specific example of the practice of this invention:

1 ton of laminaria saccharino after demineralization is submerged in a bath containing 2½ tons of soft water or seawater in which are incorporated 22 lbs. of commercial formaldehyde (at about 40% concentration). The seaweed is left in the bath for about an hour. If desired, the seaweed can be left in the bath for a longer time, even several days, with no adverse effect. During the treatment the seaweed takes up about 40 to 45% of the formic aldehyde in the bath. The seaweed is taken from the bath and is put to one side in damp storage. As above-mentioned, the fixation of the colored matter of the seaweed on the algulose of the seaweed continues during the storage. This is advantageous, inasmuch as the treatment of the seaweed in the bath of formic aldehyde need not be continued for an inconveniently long time. The longer the seaweed remains in storage, the more complete the fixation of the colored matter becomes, provided there is no fermentation and consequent degradation of the proteinous material with which the colored matter is fixed on the seaweed. Under the conditions above-mentioned, the fixation of the colored matter on the seaweed is substantially complete at the end of fifteen days to three weeks. The seaweed while still damp is then treated with a dilute alkaline solution, e. g., about one part of the seaweed to two parts of a four per cent. solution of sodium carbonate, to dissolve the alginous material. The dissolved alginous material can be separated from the algulose and colored matter fixed thereto by means of flotation as described in said application Serial No. 1,076 (Patent No. 2,128,551) or by filtration or in any other suitable way, and under such conditions all of the colored matter remains fixed to the algulose. Care should be taken not to use an alkaline solution that is considerably stronger than is necessary to dissolve the alginous material, as stronger alkaline solutions accelerate the peptizing action of the alkali on the coagulated proteinous material and tend to liberate the colored matter. The alginous material can then be coagulated by means of an acid or alcohol, and purified by washing the coagula in known ways and preferably by resort to the methods described in said application Serial No. 1,076 (Patent No. 2,128,551). As above-mentioned, the formic aldehyde acts as an anti-fermentive agent during storage, thus permitting the preservation of the seaweed in a damp state for relatively long periods of time such as several months without fermentation of the seaweed and without resultant hydrolysis and injury to the alginous material in the seaweed. The preservation of the seaweed in this manner in itself is of great value and solves an industrial problem which heretofore has presented much difficulty. After the seaweed has been removed from the bath of formic aldehyde, the bath of formic aldehyde can be re-used for treating further seaweed but first should be brought to the desired concentration by the addition of further formic aldehyde thereto. The amount of protein coagulant which is used in the example given above is that which has been found to be suitable for practical commercial operation. By increasing the amount of protein coagulant the rapidity with which the color becomes fixed to the algulose is increased. By decreasing the amount of protein coagulant the time during which colored matter in the seaweed becomes fixed to the algulose becomes greater, and if insufficient coagulant is used, the colored matter is not entirely fixed to the seaweed. At the other extreme, use of an excessively large amount of the coagulant makes it very difficult or impossible to recover the colored matter from the algulose. When formic aldehyde is used in the amount given in the foregoing example the process is economical and the time required for fixation of the colored matter is not excessive. Moreover, the colored matter is caused to become fixed to the algulose in a condition which permits it to be eventually recovered from the algulose in the manner described in my said application Serial No. 224,508. Normally there is sufficient proteinous material in the seaweed itself to fix all of the colored matter of the seaweed on the algulose of the seaweed upon the coagulation thereof. It is not, however, without the scope of this invention to add to the mass proteinous materials such as those mentioned above in connection with the clarification of solutions of alginous material which have previously been separated from the algulose of the seaweed.

When a protein coagulant is used which is not also an anti-fermentive agent, it is preferred in the practice of this invention to treat the seaweed not only with a protein coagulant, but also with an anti-fermentive agent. Thus, an anti-fermentive agent such as salicylic acid or benzoate of soda may be used without adversely affecting the alginous material in the seaweed. Other anti-fermentive agents which may be mentioned are sodium fluoride, $SO_2$, phenol, thymol, creosote, chloride of lime, boric acid, copper sulphate and the like. Moreover, acid materials which reduce the pH of the bath in which the seaweed is treated to around 3.5 or below are to be regarded as anti-fermentive agents to a certain extent and may be used according to this invention. In general, however, the employment of any suitable anti-fermentive agent in combination with a protein coagulant in the treatment of seaweed to fix the colored matter thereof on the algulose is to be regarded as within the scope of this invention.

As aforesaid, it is preferable to use in the practice of this invention a substance which not only is a protein coagulant, but also is an anti-fermentive agent. Other aldehydes than formic aldehyde have this characteristic, e. g., ethylic aldehyde, butyric aldehyde, propionic aldehyde, and the like which have not more than 5 carbon atoms to the molecule. Moreover, polymerization products of such aldehydes (paraldehydes and metaldehydes) such as trioxymethylene in suspension in water or hexamethylene amine may be used for this purpose. The products of condensation between an aldehyde and a sulphonic derivative of a phenol, e. g., sulphonic para phenol aldehyde or certain aldehyde derivatives of phenol such as salicylic aldehyde, phenol paraoxybenzylic aldehyde, and protocatechic aldehyde, are also suitable. Such aldehydes and aldehyde derivatives may be used alone or with other protein coagulants such as aluminum salts or chromium salts.

While it is preferable to employ substances which are both protein coagulants and anti-fermentive agents, other substances may be used as mentioned above, which are protein coagulants. However, when such other substances do not have the added property of being an anti-fermentive agent, it is preferable, when the seaweed is to be preserved for a considerable period of time, to incorporate in the seaweed in addition to the protein coagulant, an anti-fermentive agent of the character hereinabove mentioned which is adapted to prevent the fermentive action of micro-organisms on the seaweed.

While the use of anti-fermentive agents or protein coagulants which are likewise anti-fermentive agents is especially useful in fixing the chlorophyllian colored matter to coagulated proteinous material adherent to the algulose of seaweed, the prevention of the fermentation of the coagulated proteinous material may be taken advantage of whenever the chlorophyllian colored matter is fixed to coagulated proteinous material according to this invention.

While this invention has been described in connection with certain examples thereof, it is to be understood that this has been done for the purpose of illustrating the practice of this invention.

While this invention has been described in connection with the fixation of chlorophyllian colored matter with algulose of seaweed, it is apparent that the invention also is applicable to the fixation of chlorophyllian colored matter to cellulose derived from other sources than seaweeds, e. g., from land plants. If such cellulose is deficient in proteinous material, proteinous material may be added thereto. Moreover, when any solid material is present in addition to proteinous material and chlorophyllian colored matter, coagulated proteinous material produced by incorporation of a protein coagulant tends to become deposited on the solid material and to fix the chlorophyllian pigment to the solid material.

More generally this invention is applicable whenever proteinous material and chlorophyllian colored matter from any source occurs together either naturally or by mixing these materials. In any such case, if a protein coagulant is added to the mixture the chlorophyllian pigment becomes fixed with the coagula of proteinous material and can be separated with the coagula from the mother liquid. If no other substances are present other than the proteinous material and the chlorophyllian colored matter, these substances may be recovered. If solid material is present such as fibrous cellulosic material or other solid vehicle, the coagula of proteinous material tends to adhere thereto and fix the chlorophyllian pigment therewith so that the solid material together with the coagulated proteinous material and fixed chlorophyllian colored matter may be readily separated from the mother liquid.

Ways of treating the coagulated proteinous material and fixed chlorophyllian colored matter either with or without the presence of other materials are described in my said application filed on even date Serial No. 224,508.

The scope of this invention is to be governed by the language of the following claims.

I claim:

1. A method comprising incorporating a protein coagulant with mixed proteinous material and chlorophyllian colored matter, thereby coagulating said proteinous material and fixing said chlorophyllian colored matter with the coagulated proteinous material.

2. In a method of treating seaweed the step which comprises incorporating a protein coagulant with an aqueous mass containing the proteinous material of the seaweed and the colored matter of the seaweed, thereby coagulating said proteinous material and fixing said colored matter with the coagulated proteinous material.

3. A method comprising incorporating a protein coagulant in an aqueous mixture containing proteinous material and chlorophyllian colored matter, thereby coagulating said proteinous material and fixing said chlorophyllian pigment with the coagulated proteinous material and separating the coagulated proteinous material and colored matter fixed therewith from the mother liquid.

4. A method comprising incorporating a protein coagulant in an aqueous dispersion of a mixture of proteinous material and chlorophyllian colored matter to coagulate the proteinous material and fix the chlorophyllian colored matter therewith, and then separating from the mother liquid the coagulated proteinous material and chlorophyllian colored matter fixed therewith.

5. A method comprising incorporating a protein coagulant in an aqueous dispersion of a mixture of proteinous material and chlorophyllian colored matter to coagulate the proteinous material and fix the chlorophyllian colored matter therewith, and then separating from the mother liquid the coagulated proteinous material and chlorophyllian colored matter fixed therewith by charging the mass with a multiplicity of bubbles which rise to the surface and carry the coagulated proteinous material to the surface.

6. A method comprising dispersing proteinous material in an aqueous dispersion of chlorophyllian colored matter, incorporating a protein coagulant in the resulting mixture to coagulate the proteinous material and fix the chlorophyllian colored matter therewith, and separating from the mother liquid the coagulated proteinous material and chlorophyllian colored matter fixed therewith.

7. A method of separating chlorophyllian colored matter from alginous material which comprises forming an aqueous mass containing alginous material and dispersed proteinous material and chlorophyllian pigment, incorporating a protein coagulant with the mixture, thereby coagulating the proteinous material and fixing the chlorophyllian colored matter therewith and separating said coagula and chlorophyllian colored matter fixed therewith from the mother liquid while the alginous material is dissolved in the mother liquid.

8. A method of separating chlorophyllian pigment from alginous material which comprises forming an aqueous mass containing dissolved alginous material, proteinous material and chlorophyllian pigment, incorporating with the mass a protein coagulant which leaves the alginous material in a dissolved condition to coagulate the proteinous material and fix the chlorophyllian colored matter therewith, and separating the coagulated proteinous material and chlorophyllian colored matter fixed therewith from the solution of dissolved alginous material.

9. A method comprising incorporating a protein coagulant with an aqueous mass containing fibrous cellulosic material, proteinous material and chlorophyllian pigment to coagulate said proteinous material and fix said colored matter together with the coagulated proteinous material on the cellulosic material.

10. In a method of treating seaweed, the step which comprises fixing the colored matter of seaweed on the algulose of the seaweed by treating a mass of seaweed containing algulose and proteinous material with a protein coagulant.

11. A method of recovering alginous material from seaweed containing proteinous material and colored matter which comprises fixing colored matter of the seaweed on the algulose of the seaweed by treating the seaweed with a protein coagulant, then treating the seaweed with dilute alkaline solution to dissolve the alginous material, and separating the alkaline solution containing dissolved alginous material from the algulose and from the colored matter of the seaweed and coagulated proteinous material fixed on said algulose.

12. In a method of recovering alginous material from seaweed wherein the seaweed is demineralized by washing, leaving a demineralized mass of seaweed comprising algulose, proteinous material, colored matter and alginous material, and wherein the alginous material in the mass is separated from the algulose by treating the mass with a dilute alkaline solution to dissolve the alginous material and by separating the alkaline solution containing dissolved alginous material from the algulose, the step comprising fixing the colored matter in said mass on the algulose by incorporating in the mass a protein coagulant after the demineralizing of the seaweed and prior to the dissolving of the alginous material in the alkaline solution.

13. A method comprising incorporating a protein coagulant with mixed proteinous material and chlorophyllian colored matter, thereby coagulating said proteinous material and fixing said chlorophyllian colored matter with the coagulated proteinous material, an anti-fermentive agent being incorporated in the mixture.

14. In a method of treating seaweed, the steps comprising fixing the colored matter of seaweed on the algulose of the seaweed by treating the seaweed with a protein coagulant, an anti-fermentive agent being incorporated with said seaweed in addition to said protein coagulant.

15. A method comprising incorporating a protein coagulant with mixed proteinous material and chlorophyllian colored matter, thereby coagulating said proteinous material and fixing said chlorophyllian colored matter with the coagulated proteinous material, said protein coagulant being an anti-fermentive agent adapted to prevent the fermentation of the coagulated proteinous material.

16. In a method of treating seaweed, the step comprising fixing the colored matter of seaweed on the algulose of the seaweed by treating the seaweed with a protein coagulant which is an anti-fermentive agent.

17. In a method of treating seaweed, the step comprising fixing the colored matter of seaweed on the algulose of the seaweed by treating the seaweed with a substance selected from the group consisting of aldehydes having not more than 5 carbon atoms to the molecule, polymerization products of said aldehydes, and products of condensation of said aldehydes with a sulphonic derivative of a phenol.

18. In a method of treating seaweed, the step comprising fixing the colored matter of seaweed on the algulose of the seaweed by treating the seaweed with formic aldehyde.

19. In a method of treating seaweed the steps comprising treating the seaweed with a bath containing a protein coagulant in aqueous solution to partially fix the colored matter of the seaweed on the algulose of the seaweed, and then removing the seaweed from said bath, additional fixation of said colored material of the seaweed on the algulose of the seaweed occurring after the removal of the seaweed from said bath during storage of the seaweed while said seaweed is damp with said solution of said protein coagulant.

20. In a method of treating seaweed, the steps comprising treating the seaweed with a bath containing a protein coagulant in aqueous solution to partially fix the colored matter of the seaweed on the algulose of the seaweed, and then removing the seaweed from said bath, additional fixation of said colored material of the seaweed on the algulose of the seaweed occurring after the removal of the seaweed from said bath during storage of the seaweed while said seaweed is damp with said solution of said protein coagulant and while said seaweed is in the presence of an anti-fermentive agent incorporated in the seaweed.

VICTOR CHARLES EMILE LE GLOAHEC.